United States Patent Office 2,978,508
Patented Apr. 4, 1961

2,978,508
SYMMETRICAL SECONDARY ALIPHATIC POLYNITRO DIAMINES

Milton B. Frankel, Pasadena, and Karl Klager, Monrovia, Calif., assignors to Aerojet-General Corporation, Azusa, Calif., a corporation of Delaware No Drawing. Filed June 5, 1956, Ser. No. 589,559

12 Claims. (Cl. 260—583)

This invention relates to new compositions of matter and a method for their preparation. In particular this invention relates to symmetrical polynitro diamines having the general formula:

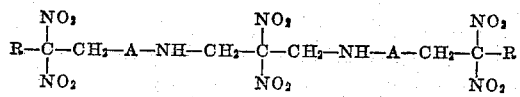

wherein R is a nitro or alkyl radical and A is an alkylene radical.

Due to their high oxygen content these compounds find valuable use as explosives.

This application is a continuation in part of our co-pending U.S. patent application No. 419,616, filed March 29, 1954, now abandoned.

The compounds of this invention are prepared by condensing geminal polynitro-containing amines with 2,2-dinitro-1,3-propanediol, in accordance with the general reaction scheme set forth below:

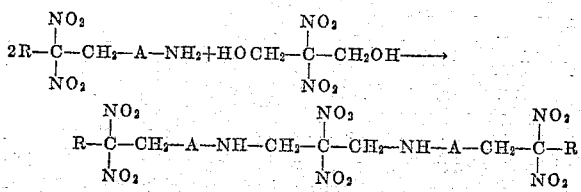

wherein R and A are as identified above.

Optimum results were obtained when the reaction was conducted at a pH of less than about 8 and preferably from about 4 to 8. As a matter of convenience, it is preferred to generate the primary amine in situ. This may be accomplished by employing the mineral acid salt of the amine as the starting material and conducting the reaction in the presence of a base such as the hydroxides or a lower alkanoic acid salt of an alkali or alkaline earth metal. Alternatively the amine may be introduced into the reaction mixture as the amine salt of a weak organic acid which will hydrolyze to produce the free amine.

The amines used as starting materials in this invention are obtained by the reaction of a strong mineral acid upon the corresponding isocyanates which may be obtained by the reaction of a polynitro acyl halide upon sodium azide, as disclosed in assignee's copending application No. 405,515, filed January 21, 1954, now Patent No. 2,923,726.

To more fully illustrate our invention, the following examples are presented. It should be understood, however, that these examples are presented merely as a means of illustration and are not intended to limit the scope of the invention in any way.

EXAMPLE I
*Preparation of 1,1,1,6,6,11,11,11-octanitro-4,8-diaza undecane*

To a solution of 8.3 gm. (0.05 mole) of 2,2-dinitro-1,3-propanediol, 23.0 gm. (0.10 mole) of 3,3,3-trinitropropyl amine hydrochloride and 50 ml. of water was added a solution of 88 ml. of 1.136 N sodium hydroxide (0.10 mole). A yellow solid precipitated. The product was collected, washed with water and dried to give 21.7 gm. (88.8%) of a tan solid, M.P. 70–80° C., with decomposition. The explosive values for this compound are as follows:
Lead block value 143 TNT=100.
Ballistic mortar value 146 TNT=100.

EXAMPLE II
*Preparation of 2,2,7,7,12,12-hexanitro-5,9-diaza tridecane*

2,2,7,7,12,12-hexanitro-5,9-diaza tridecane was prepared by condensing 2,2-dinitro-1,3-propanediol with 3,3-dinitrobutyl amine in accordance with the procedure described in Example I. The product was obtained in a 74.2% yield and exhibited a M.P. of 95–110° C., with decomposition. The explosive values of this compound are as follows:
Lead block value 91 TNT=100.
Ballistic mortar value 110 TNT=100.

We have also found that amines such as 4,4-dinitrohexyl amine, 3,3-dinitroamyl amine and 4,4,4-trinitrobutyl amine readily condense with 2,2-dinitro-1,3-propanediol to yield their corresponding polynitro diamines, namely, 3,3,9,9,15,15-hexanitro-7,11-diaza heptadecane, 3,3,8,8,13,13-hexanitro-6,10-diaza pentadecane and 1,1,1,7,7,13,13,13-octanitro-5,9-diaza tridecane.

It is apparent that any member of this series of symmetrical aliphatic polynitro diamines may be readily prepared by merely selecting the appropriate polynitro amine and condensing it with 2,2-dinitro-1,3-propanediol, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

We claim:
1. As compositions of matter, symmetrical secondary aliphatic polynitro diamines having the general formula:

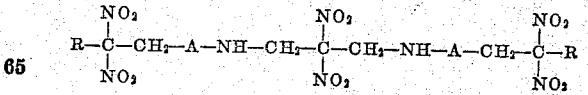

wherein A is a lower alkylene radical and R is a radical selected from the group consisting of nitro and lower alkyl radicals.

2. As compositions of matter, symmetrical secondary aliphatic polynitro diamines having the general formula:

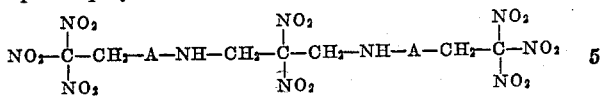

wherein A is a lower alkylene radical.

3. As compositions of matter, symmetrical secondary aliphatic polynitro diamines having the general formula:

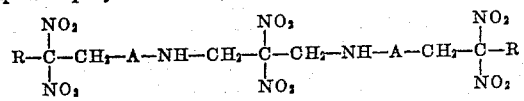

wherein A is a lower alkylene radical and R is a lower alkyl radical.

4. As a composition of matter, 2,2,7,7,12,12-hexanitro-5,9-diaza tridecane having the structural formula:

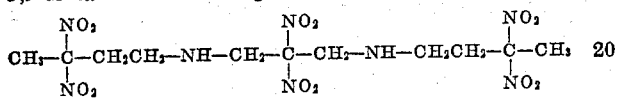

5. As a composition of matter, 1,1,1,6,6,11,11,11-octa-nitro-4,8-diaza undecane having the structural formula:

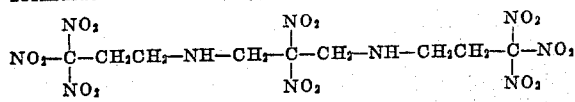

6. The method of preparing symmetrical secondary aliphatic polynitro diamines having the general formula:

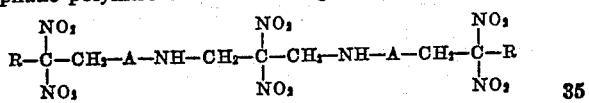

which comprises condensing 2,2-dinitro-1,3-propanediol with a poly-nitro-amine having the general formula:

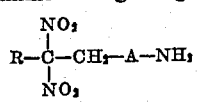

wherein A is a lower alkylene radical and R is a radical selected from the group consisting of nitro and lower alkyl radicals.

7. The method of claim 6 wherein the reaction is conducted at a pH of below about 8.

8. The method of preparing symmetrical secondary aliphatic polynitro diamines having the general formula:

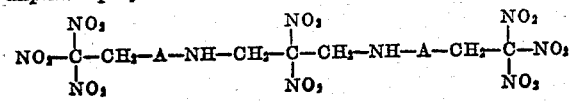

which comprises condensing 2,2-dinitro-1,3-propanediol with a polynitro-amine having the general formula:

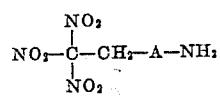

wherein A is a lower alkylene radical.

9. The method of preparing symmetrical secondary aliphatic polynitro diamines having the general formula:

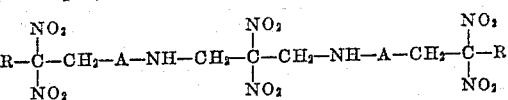

which comprises condensing 2,2-dinitro-1,3-propanediol with a polynitro-amine having the general formula:

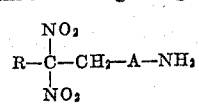

wherein A is a lower alkylene radical and R is a lower alkyl radical.

10. The method of preparing symmetrical secondary aliphatic polynitro diamines having the general formula:

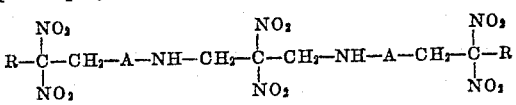

which comprises condensing 2,2-dinitro-1,3-propanediol with a strong mineral acid salt of a primary polynitro-amine having the general formula:

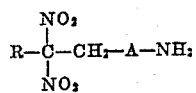

wherein A is a lower alkylene radical and R is a radical selected from the group consisting of lower alkyl and nitro radicals, in the presence of a base selected from the group consisting of the hydroxides of alkali and alkaline earth metals.

11. The method of preparing 2,2,7,7,12,12-hexanitro-5,9-diaza tridecane which comprises condensing 3,3-dinitrobutyl amine hydrochloride with 2,2-dinitro-1,3-propanediol in the presence of sodium hydroxide.

12. The method of preparing 1,1,1,6,6,11,11,11-octa-nitro-4,8-diaza undecane which comprises condensing 3,3,3-trinitropropane amine hydrochloride with 2,2-dinitro-1,3-propanediol in the presence of sodium hydroxide.

No references cited.